(12) United States Patent
O'Connor et al.

(10) Patent No.: US 10,311,489 B2
(45) Date of Patent: *Jun. 4, 2019

(54) SYSTEM AND METHOD FOR CREATION OF VISUAL JOB ADVERTISEMENTS

(71) Applicant: VIZIRECRUITER LLC, Troy, MI (US)

(72) Inventors: Joseph J. O'Connor, Bloomfield Hills, MI (US); Patrick J. Frenzel, Bloomfield Hills, MI (US)

(73) Assignee: VIZIRECRUITER, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,158

(22) Filed: Oct. 19, 2018

(65) Prior Publication Data

US 2019/0050914 A1 Feb. 14, 2019

Related U.S. Application Data

(63) Continuation-in-part of application No. 16/002,477, filed on Jun. 7, 2018, which is a continuation of application No. 15/200,287, filed on Jul. 1, 2016, now Pat. No. 10,007,932.

(60) Provisional application No. 62/187,464, filed on Jul. 1, 2015.

(51) Int. Cl.
*G06Q 30/02* (2012.01)
*G06F 17/27* (2006.01)

(52) U.S. Cl.
CPC ....... *G06Q 30/0276* (2013.01); *G06F 17/271* (2013.01)

(58) Field of Classification Search
CPC .................................................. G06Q 30/0276

USPC ...................................................... 705/14.72
See application file for complete search history.

(56) References Cited

U.S. PATENT DOCUMENTS

| | | |
|---|---|---|
| 5,598,557 A | 1/1997 | Doner et al. |
| 6,044,365 A | 3/2000 | Cannon et al. |
| 2006/0248480 A1 | 11/2006 | Faraday et al. |
| 2009/0254557 A1 | 10/2009 | Jordan |
| 2010/0050097 A1 | 2/2010 | McGreevy et al. |

(Continued)

FOREIGN PATENT DOCUMENTS

WO 8804454 6/1988

OTHER PUBLICATIONS

PCT Search Report for International Application No. PCT/US2013/075263 dated May 13, 2014.

(Continued)

*Primary Examiner* — Arthur Duran
*Assistant Examiner* — Derek Jessen
(74) *Attorney, Agent, or Firm* — Carlson, Gaskey & Olds, P.C.

(57) ABSTRACT

This disclosure relates to a system and method for creating a job advertisement. The job advertisement includes visual information which is presented an in organized, easily digestible manner. An example system according to the present disclosure includes, among other things, a first computing device a second computing device in communication with the first computing device. The second computing device is configured to receive an input of text describing a job from the first computing device and create a job advertisement including at least one image representative of at least a portion of the text.

15 Claims, 8 Drawing Sheets

(56) References Cited

U.S. PATENT DOCUMENTS

2010/0114789 A1\* 5/2010 Dane ................. G06O 10/06
    705/321
2011/0055919 A1  3/2011 Hamilton, II et al.
2012/0265770 A1  10/2012 Desjardins et al.
2015/0293887 A1\* 10/2015 H .................. G06Q 10/105
    715/249
2016/0125451 A1\* 5/2016 Garg ............. G06O 30/0243
    705/14.42

OTHER PUBLICATIONS

Peil, Jr. James Francis, et al. PCT-US1375263, Title: System and method for Generating Information Graphics. Filed Dec. 16, 2013.

\* cited by examiner

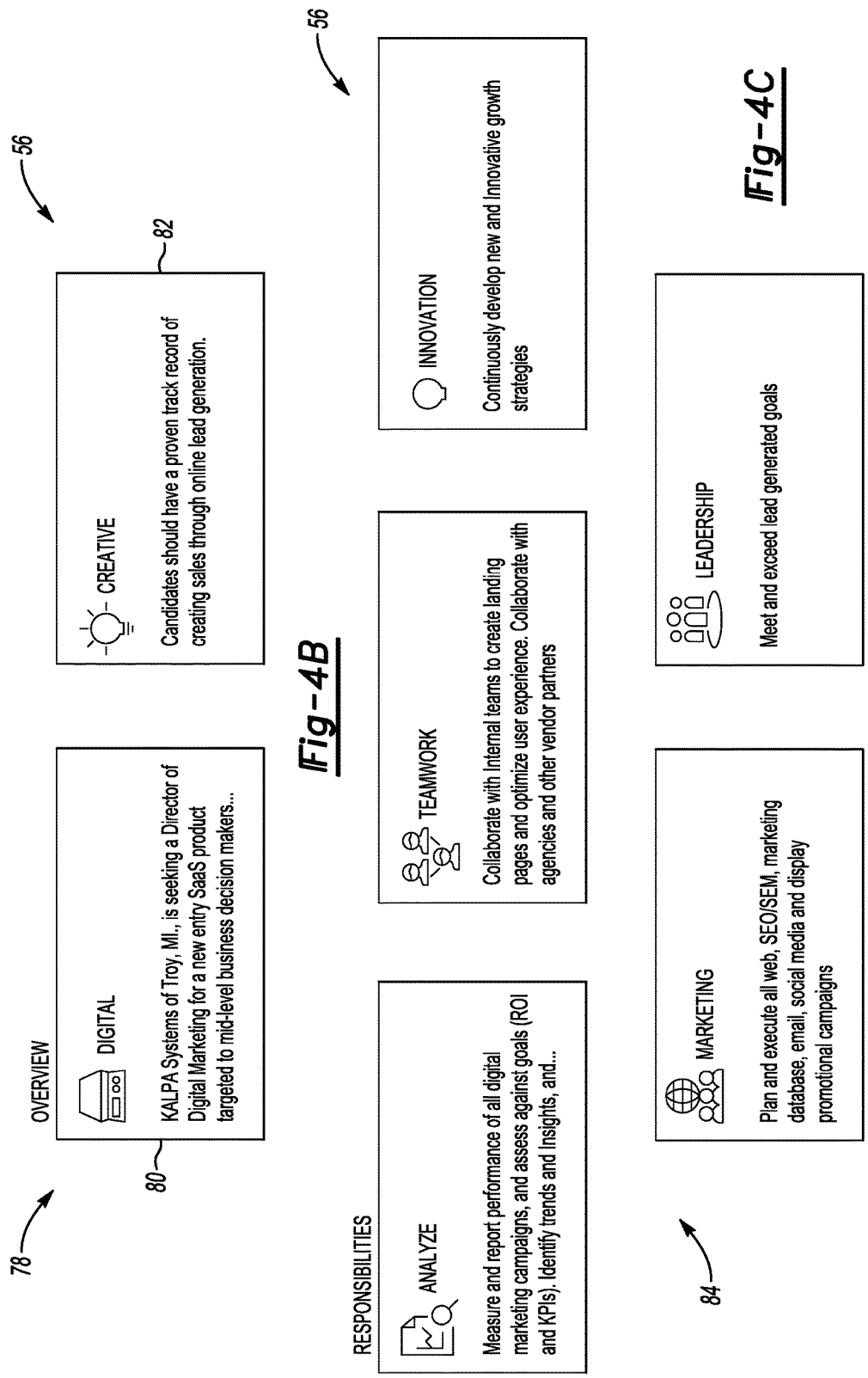

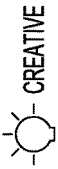

REQUIREMENTS

EXPERIENCE
5-years working experience in BTB digital marketing. Demonstrable experience leading and managing SEO/SEM, marketing database, email, social media...

MARKETING
Up-to-date with the latest trends and best practices in online marketing and measurement DEGREE
BS/MS degree in marketing or a related field CREATIVE
Highly creative with experience in identifying target audiences and devising digital campaigns that engage, inform and motivate KNOWLEDGE
Solid knowledge of website analytics tools (e.g., Google Analytics, Netinsight, Omniture, Web Trends)

*Fig-4D*

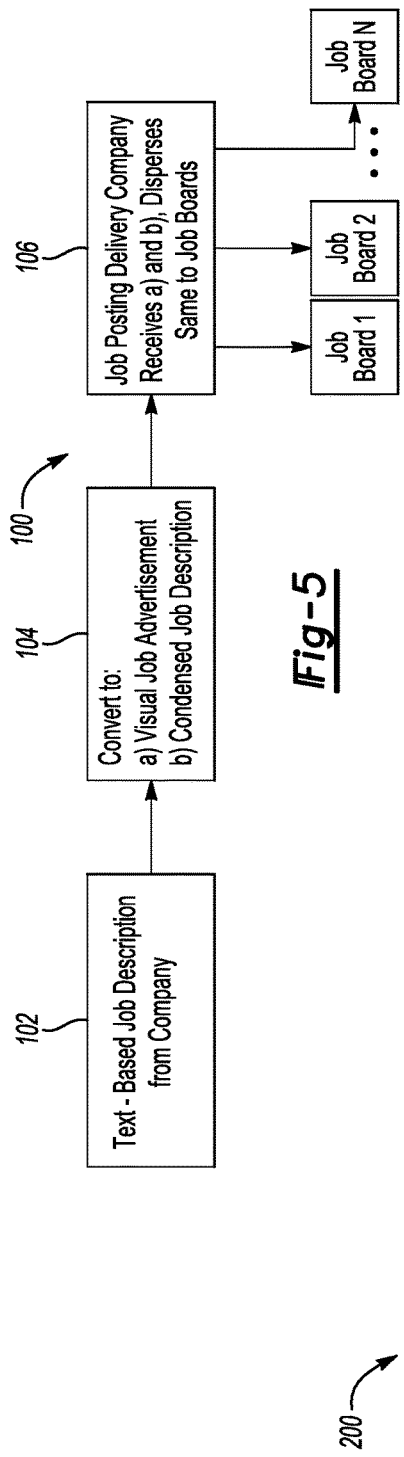

SYSTEM AND METHOD FOR CREATION OF VISUAL JOB ADVERTISEMENTS

RELATED APPLICATIONS

This application is a continuation-in-part of prior U.S. application Ser. No. 16/002,477, filed Jun. 7, 2018, which is a continuation of prior U.S. application Ser. No. 15/200,287, filed Jul. 1, 2016 (now issued as U.S. Pat. No. 10,007,932), which claims the benefit of U.S. Provisional Application No. 62/187,464, filed Jul. 1, 2015. The '477, '287, and '464 applications are herein incorporated by reference in their entirety.

BACKGROUND

This disclosure relates to a system and method for creating visual job advertisements (which also may be referred to as "job ads" or "job postings").

The Internet has become a primary source for individuals seeking new employment. When searching for new employment, individuals typically enter keywords into a search engine, and are directed to various job postings on company websites or third party websites such as Monster.com. These job postings are largely, if not completely, text-based, typically because a job posting is a legal description of a position. Users are required to sort through the text to determine whether the job posting fits their particular skill set. However, in lieu of taking the time to understand the text, some users will overlook job postings that would have been applicable to them. On the other hand, some users will simply apply to a job regardless of whether they are truly interested or qualified.

SUMMARY

This disclosure relates to a system and method for creating a job advertisement. The job advertisement includes visual information which is presented in an organized, easily digestible manner. An example system according to the present disclosure includes, among other things, a first computing device a second computing device in communication with the first computing device. The second computing device is configured to receive an input of text describing a job from the first computing device and create a job advertisement including at least one image representative of at least a portion of the text.

BRIEF DESCRIPTION OF THE DRAWINGS

The drawings can be briefly described as follows:

FIG. 4B is a view of a second aspect of the example visual job advertisement.

FIG. 4C is a view of a third aspect of the example visual job advertisement.

FIG. 4D is a view of a fourth aspect of the example visual job advertisement.

FIG. 5 is a flow chart representative of an example workflow of the present disclosure.

FIG. 6 illustrates an example template for a condensed job description.

DETAILED DESCRIPTION

This disclosure relates to a system and method for creating a job advertisement. The job advertisement includes visual information which is presented an in organized, easily digestible manner.

Figure 1:
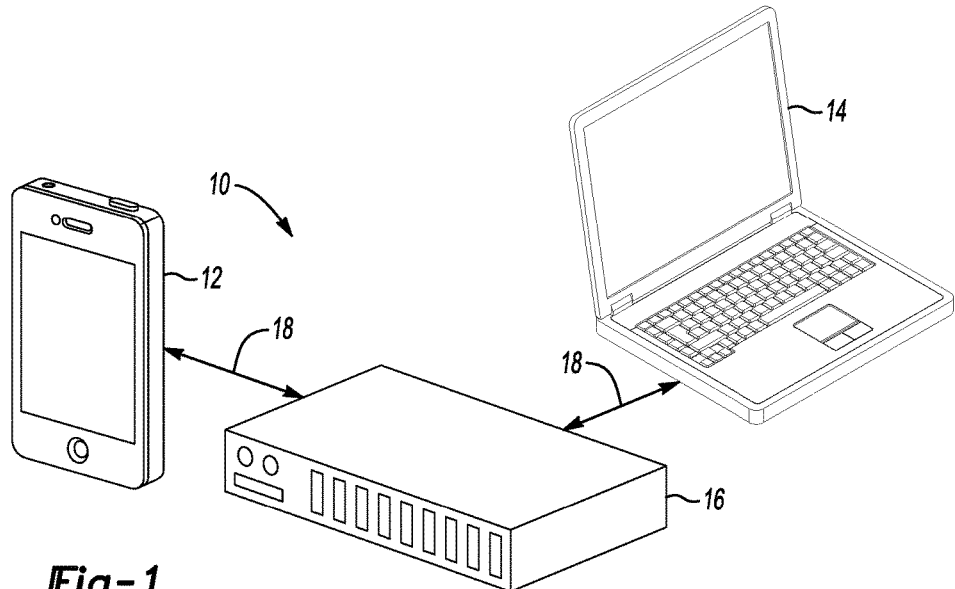
FIG. 1 is a highly schematic view of an example system according to this disclosure.

FIG. 1 is a highly schematic view of an example system 10 for creating a visual job advertisement or posting. In particular, the system 10 and method of this disclosure are configured to automatically generate visual or graphic-based job ads that generally resemble "infographics" or "web graphics." Infographics or web graphics are visual representations of information and data. In this disclosure, the job postings contain visual information relating to a particular position.

In one example, the system 10 includes a first computing device 12, a second computing device 14, and a third computing device 16. As shown in FIG. 1, the first computing device 12 is a mobile computing device, such as a tablet or a smartphone. The second computing device 14 is a laptop or another computer, and the third computing device 16 is a computing device including a server. Relative to the third computing device 16 in particular, while shown as a single server, the third computing device 16 can be implemented using multiple components at various locations. The first, second, and third computing devices 12, 14, 16 are illustrated for purposes of explanation, and should not be considered as limiting regarding the type or number of computing devices used for generating job postings in a manner consistent with the disclosed system.

In this example, the first, second, and third computing devices 12, 14, 16 are in communication with each other as schematically shown via a connection 18, which may be a wireless link or other connection, such as those used to access the Internet. Each of the first, second, and third computing devices 12, 14, 16 may include memory, hardware, and software, and be configured to communicate with one another and transmit data between one another. The first, second, and third computing devices 12, 14, 16 may further be configured to store information and data, and send and receive instructions to one another to execute the methodology described below.

Figure 2:
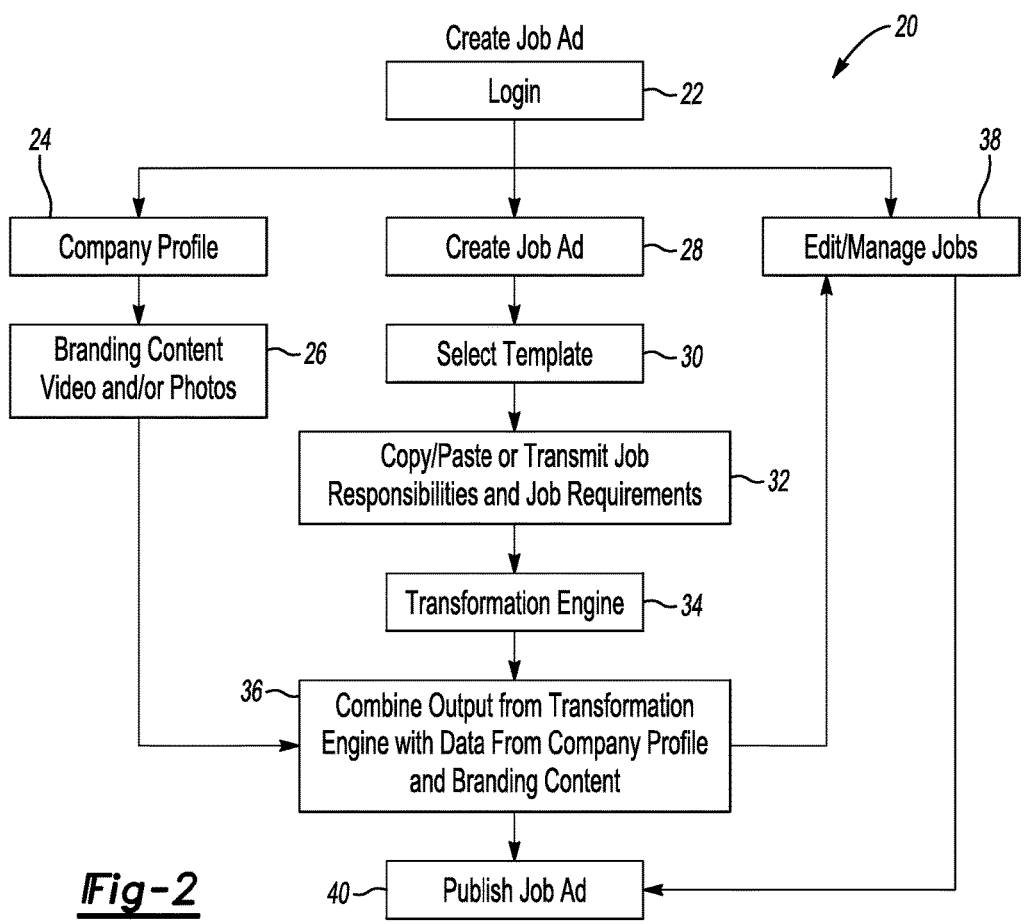
FIG. 2 is a flow chart representative of an example method according to this disclosure.

FIG. 2 illustrates an example method 20 of generating a job posting. The method 20 can be used to create and manage any number of job ads specific to a particular user. An example user is a company or, more particularly, a recruiter, human resources representative, or hiring manager of the company. In the method 20, the user first logs in, at 22, to a job ad creation service hosted on the third computing device 16, for example. In the example, the user may be logging in to the service using the second computing device 14.

At 24, the user has the opportunity to create, or edit, a company profile associated with its job postings. The company profile can include information such as a company logo and a company description. For example, at 26, the user can upload branding content including videos and/or photos associated with the company. The company profile can be stored on the third computing device 16 and used for multiple job ads. That is, the user is not required to create a new company profile with the creation of each job ad.

However, the user can edit the company profile as necessary. The company profile information is useful for customizing the job ads of that company such that they have the look and feel of the particular company. In other examples, the user does not create a company profile. In that case, a user can select a profile from a bank of generic profiles stored on the third computing device 16.

Next, at 28, the user begins creating a job ad. At 30, the user may select a template for the job ad. The template may be a template infographic, which may contain background graphics, and generally show the user the proposed layout of the job ad. The template may include fields such as "Job Summary," "Responsibilities," "Requirements," "About Company," "Job Title," "Image 1," "Image 2," "Visual 1," "Video 1," etc. The template is an HTML5 animated template in one example. The user may select from one of a plurality of templates stored on the third computing device 16. The user can also customize or edit the stored templates.

In addition to selecting a template, the user provides an input of text at 32, which is the text of the job description. In one example, the user can copy and paste the text from an already-existing text document, such as a Microsoft Word™ document, or the user can upload a document containing the text. Alternatively, the user may have already created a job posting on an internal, company website or via a third party job posting service such as Monster.com. The user can copy and paste the text from the job posting as the text input. The text of the job description will generally include the job responsibilities and requirements, as well as other information related to the particular position.

Figure 3:
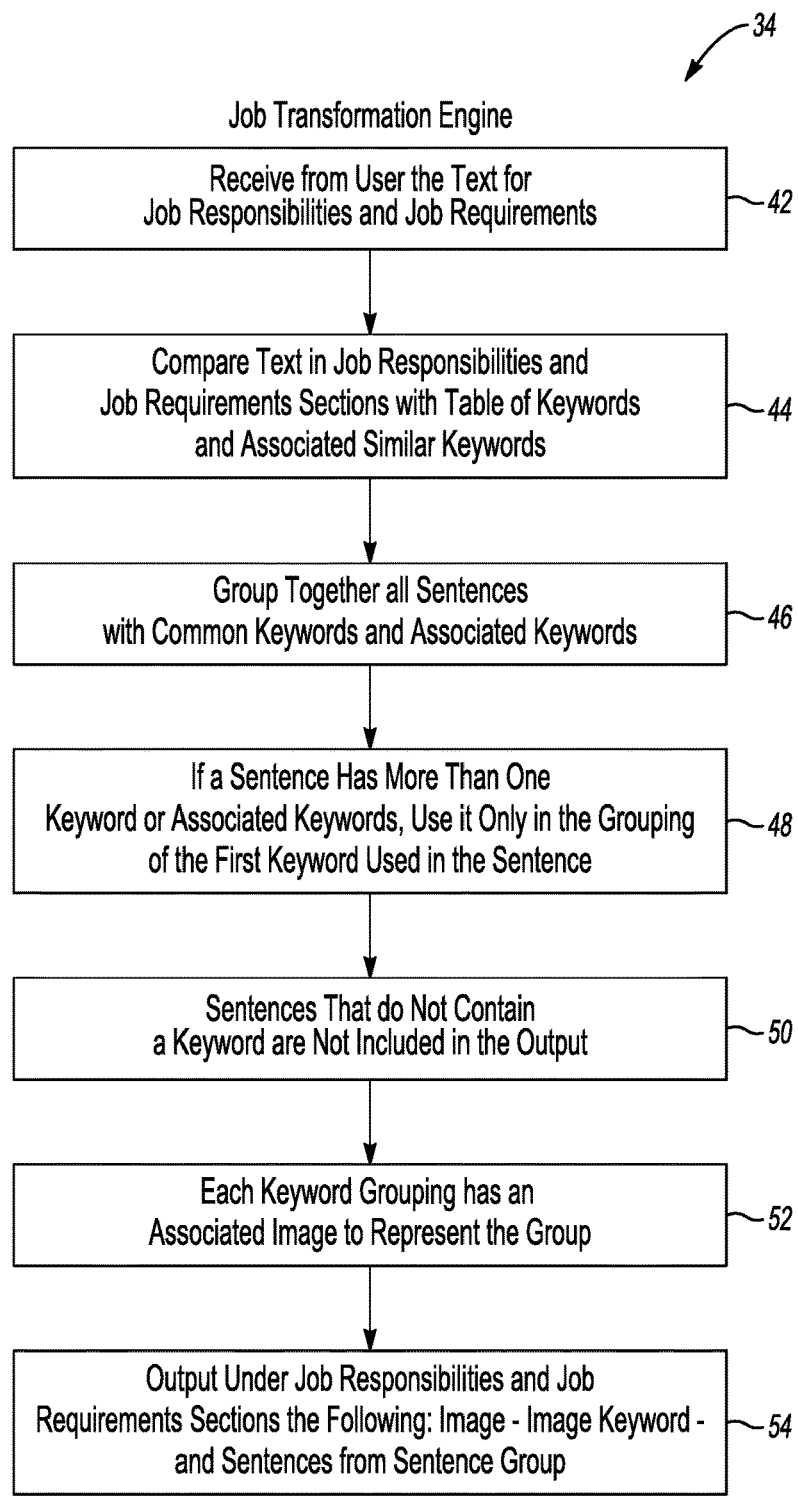
FIG. 3 is a flow chart representative of an aspect of the method of FIG. 2.

After 32, the text relating to the job description is submitted to a transformation engine 34, which is a program executed on the third computing device 16. The transformation engine 34, which will be described in detail with reference to FIG. 3, is configured to essentially automatically convert the text of the job description into a format containing images and/or visuals for use in the job posting. The output of the transformation engine 34 is applied to the template and merged, at 36, with the company profile.

The user is allowed to edit all job postings it has created, at 38. Once satisfied that a particular job posting is ready to publish, the posting is published, at 40. The job posting provides applicants with highly relevant information regarding the position in an easily digested format. Further, creation of the job posting is relatively easy as a large portion of work is done by the third computing device 16 using the transformation engine 34.

In one example, the third computing device 16 includes a server that hosts the job ad. In that example, the user is provided with a URL specific to a particular job ad. The user can post the URL on a social media page, such as Twitter or Facebook, for potential job applicants to view. A potential job applicant can access the job ad via a mobile device such as the first computing device 12, for example, by selecting the URL. The job ad may contain another URL linking back to the user's website where the job applicant can submit an actual job application.

FIG. 3 is a flow chart schematically illustrating the detail associated with the transformation engine 34. In this example, the transformation engine 34 comprises a program executed by the third computing device 16. After the user inputs text describing a particular job posting via the second computing device 14, at 32 (FIG. 2), the third computing device 16 receives that text at 42.

In this example, the third computing device 16 contains a table of keywords and associated keywords that have been previously identified as pertaining to particular jobs or job types. Since there are a number of ways to describe a particular position, the table is useful for grouping common themes in the job posting together. For instance, the table of keywords may include, for a software engineering position, a term such as "develop." For the term "develop," associated keywords may include "program" or "code." There may be additional keywords that account for differences in language (such as American English versus British English). Another keyword may be "networking." For "networking," associated keywords may include "communications" or "local area network."

At 44, the transformation engine 34 parses the input text, finds all of the keywords and associated keywords in the input, and determines the number of occurrences of each keyword and associated keyword. At 46, all sentences having common keywords and associated keywords are grouped together into a common sentence group. At 48, to avoid duplicating information in the job ad, if a sentence has more than one keyword or associated keyword, only the first-occurring keyword or associated keyword (i.e., the keyword coming first in a particular sentence) is used for purposes of grouping. At 50, sentences that do not contain a keyword are essentially ignored, and excluded for purposes of generating the visual or graphic-based output.

At 52, each sentence group is assigned an associated image, which represents the keyword and any associated keywords in the sentence group. The third computing device 16 includes memory that stores a number of different images, and the transformation engine 34 is configured to associate a particular image with a particular keyword. For instance, for the keyword "develop," the transformation engine 34 assigns an image of an individual typing into a computer. At 54, the transformation engine provides an output of an image, an image keyword, and the sentences within the sentence group. For example, instead of presenting a user with several sentences that describe software development, the output of the transformation engine 34 provides an image of a computer programmer, with the term "Develop," and a few lines of text derived from the sentences in the sentence group (e.g., "programming in C++," or "coding to meet client requirements"). This information is then input into the template selected at step 30, and is combined with the company profile at step 36 to create the job ad.

The job posting created using the disclosed system and method provides applicants with highly relevant information in an easily digested format. Further, creation of the job posting is relatively easy as a large portion of work is done by the third computing device 16 and, in particular, the transformation engine 34. The benefits provided by the example system and method become even more apparent to relatively large companies that may be creating and managing hundreds or even thousands of job postings at any given time.

FIGS. 4A-4E illustrate an example visual job advertisement 56 created using the system and method discussed above. The visual job advertisement 56 is presented to the user, in this example, as a single web page, or within an app, in which the user can scroll or use radio buttons 57 to navigate to different sections of the visual job advertisement 56. In this example, there are five radio buttons 57 corresponding to summary, overview, responsibilities, requirements, and about us sections of the visual job advertisement 56.

Figure 4A:
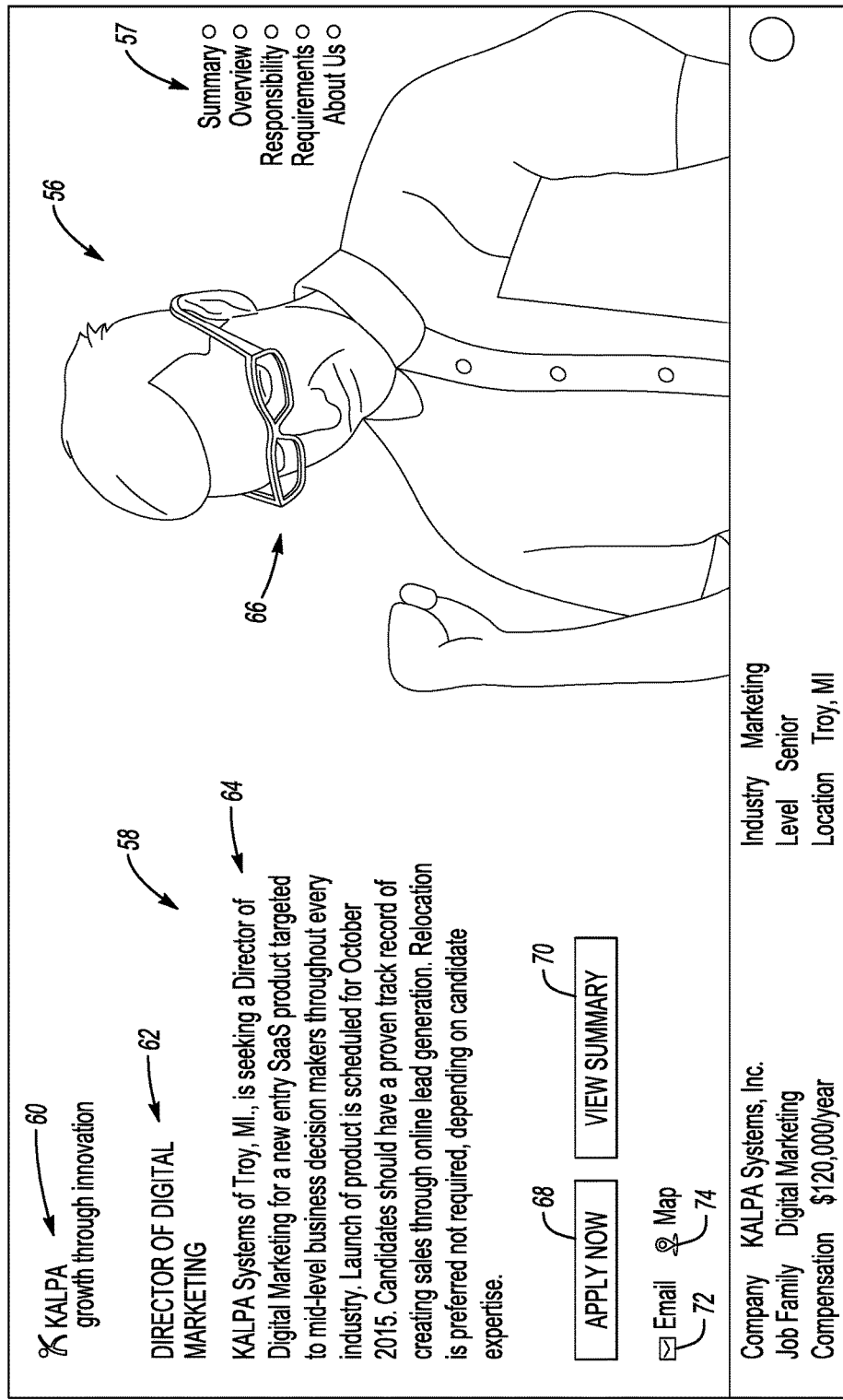
FIG. 4A is a view of a first aspect of an example visual job advertisement.

FIG. 4A illustrates an example summary section 58 of the visual job advertisement 56. The summary section 58 includes a company logo 60, a job title 62, and a brief description 64 of the job. The summary section 58 also includes a graphic 66, an "apply now" button 68, and a "view summary" button 70. The "apply now" button 68 directs the user away from the visual job advertisement 56 to a website (such as a company's HR website) where they can apply for the job. Using the "view summary" button 70, the user is also directed to the company website to view the company's version of the job description. The summary section 58 further includes, in this example, an email button 72, a location button 74, and a summary line 76 including high level information about the advertised job in bulleted format. The company logo 60 and the graphic 66 can be saved and used as a template for additional job ads.

FIG. 4B illustrates an example overview section 78. The example overview section 78 includes first and second blocks 80, 82, each of which include an image, an associated keyword, and associated text from the original job description, as generally discussed above relative to the method 20 of FIGS. 2-3. The first and second blocks 80, 82 present easily digested information to the user. In this example, the user can immediately tell that the position is requires "digital" skills (from the first block 80) and the applicant must be "creative" (from the second block 82).

FIG. 4C illustrates an example responsibilities section 84. Like the overview section 78, the responsibilities section 84 includes a plurality of blocks (here five) containing an image, an associated keyword, and an associated line of text relating to the responsibilities of the job. Thus, the information relating to the job responsibilities is easily digested by the user.

FIG. 4D illustrates an example requirements section 86. Like the overview and responsibilities sections 78, 84, the requirements section 86 also includes a plurality of blocks (here five) containing an image, an associated keyword, and an associated line of text relating to the requirements of the position. Again, the information relating to requirements of the job is easily digested.

Figure 4E:
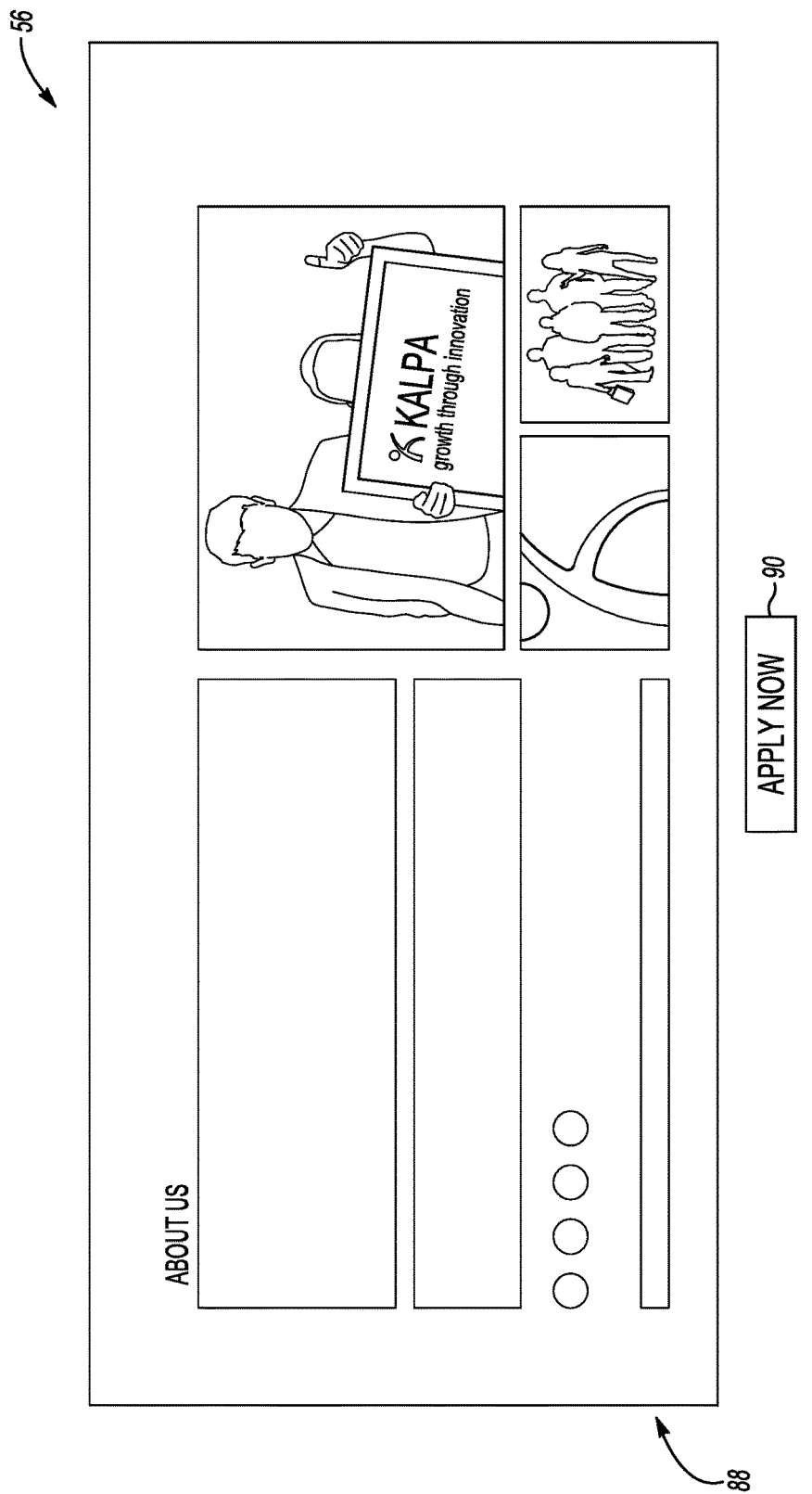
FIG. 4E is a view of a fifth aspect of the example visual job advertisement.

Finally, FIG. 4E illustrates an example about us section 88 in which the company associated with the job advertisement 56 can include information about their company. The about us section 88 can be stored and saved as a template for use with all job ads, or can be customized. In this example, the about us section 88 also includes an "apply now" button 90, which has the same function as the "apply now" button 68.

Again, the above-discussed visual job advertisements provide information that is more easily digested by a user. Not only that, but the above-discussed visual job advertisements serve as corporate branding statements and are used by the hiring company (i.e., potential employer) as a bridge between their corporate website and a traditional text-based job description. Further, because the above-discussed visual job advertisements are aesthetically pleasing, it is more likely to be shared and distributed by social media, text message, and email. The benefits of increased sharing of a visually pleasing and readily digested job advertisement are numerous. Among them, job applicants become more engaged with the visual job advertisement, and thus job applicants can more easily make a decision about whether to apply for a particular position. Hiring companies receive applications from more qualified candidates, because the candidates can more readily determine whether they are a good fit for a particular position, and because qualified candidates are more likely to have received a message via social media, text message, or email, etc., again, because people are more likely to share a visual job advertisement than a text-based job description.

Despite the benefits of the above-discussed visual job advertisements, in some forums there is still a preference towards text. That said, the text of most traditional text-based job descriptions is relatively cumbersome, disorganized, and includes extraneous information. Potential job candidates are required to scroll through pages of text in a web browser. Thus, there is a need for a condensed job description.

FIG. 5 is a schematic representation of an improved workflow according to an aspect of this disclosure. In one example, the workflow 100 may be implemented to convert a company's traditional text-based job description to one or both of a) a visual job advertisement, such as that discussed above, and/or b) a condensed job description, examples of which will be described below relative to FIGS. 6 and 7. In general, however, the condensed job description has substantially fewer words than the input, traditional text-based job description, and the condensed job description organizes those words in a way that is more meaningful and readily digested by a potential job applicant.

Traditionally, hiring companies send a text-based job description directly to a job posting delivery company. One such company is known as eQuest. By retaining a job posting delivery company, hiring companies can send a text-based job description to a single location—the job posting delivery company—and then the job posting delivery company will work with various job boards to post that text-based job description as a job posting on job boards such as Monster.com, Ladders, Indeed, etc.

In the workflow 100, the text-based job description is converted into at least one different format before being dispersed to a job posting delivery company or directly to a job board. Specifically, in the workflow 100, a company provides a text-based job description 102, and the text-based job description 102 is converted, at 104, to a) a visual job advertisement and b) a condensed job description.

The conversion may be performed by a software program configured to run on a computing device, such as server and/or one of the computing devices 12, 14, 16, which is in communication with the computing devices of the company. The computing device may be in-house (i.e., may be a server of the company) or may be a computing device of a third party, such as the Applicant of the present disclosure, ViziRecruiter, LLC based in Troy, Mich. In one example of this disclosure, the conversion at block 104 converts the text-based job description to both a) a visual job advertisement and b) a condensed job description. In other examples, the conversion at block 104 may convert the text-based job description to one or the other of a) a visual job advertisement and b) a condensed job description. Regardless, the conversion at block 104 converts the text-based job description into at least one improved format, and, again, in some examples the conversion converts the text-based job description into two improved formats.

At 106, the job posting delivery company receives the a) visual job advertisement and b) condensed job description. The job posting delivery company may also receive the original text-based job description. The job posting delivery company then sends the a) visual job advertisement and b) condensed job description, and, optionally, the original text-based job description, to various job boards, which are labeled in FIG. 5 as "Job Board 1," "Job Board 2," through "Job Board N," where N is a number equal to the number of job boards that receive the job posting information from the job posting delivery company. Of course, N can vary based on the requirements of the company and the reach of the job posting delivery company. The term "job board" in this context includes similar sites, such as career sites. In another example, the third party (i.e., ViziRecruiter) sends the a) visual job advertisement and b) condensed job description directly to the job boards, thereby bypassing the job posting delivery company.

While job boards typically cannot post visual job advertisements, job boards can link to them. Thus, in one example, the job posting delivery company can instruct the job boards on how the hiring company intends to use the a) visual job advertisement and b) condensed job description, and the job boards can then post a job posting on their job boards that incorporates (either by linking or directly posting) one or more of the visual job advertisement and/or the condensed job description. In a specific example, a job board may use the condensed job description in place of a traditional text-based job description, and the condensed job description may include a hyperlink to a visual job advertisement such as that discussed above. In this way, a user is never presented with a traditional text-based job description on the job board.

Figure 7:
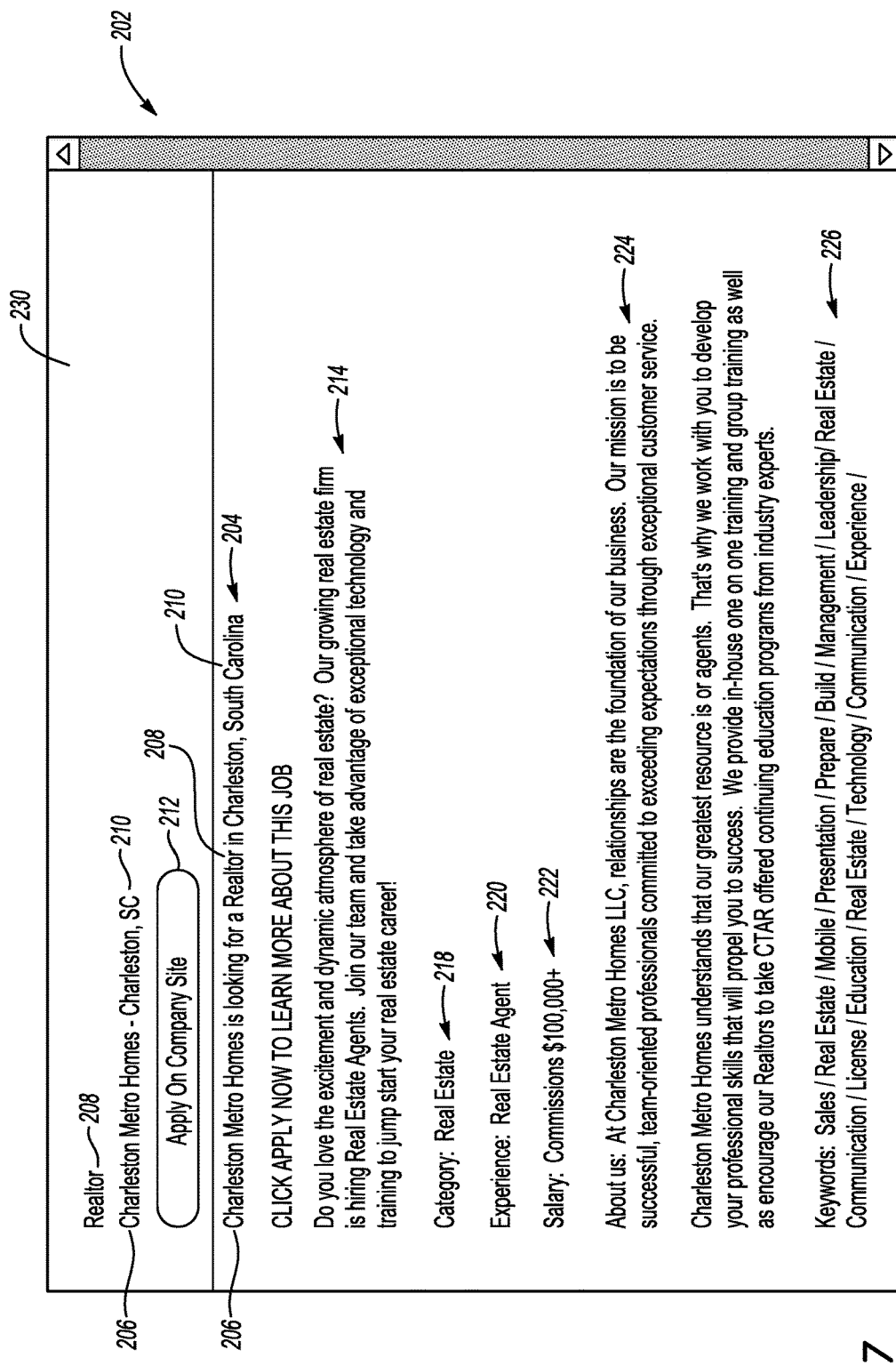
FIG. 7 illustrates an example condensed job description.

FIG. 6 is an example of a template 200 for a condensed job description 202, an example of which is shown in FIG. 7. The condensed job description 202 may be referred to colloquially or otherwise as a "teaser," because it provides a brief introduction to a job advertisement.

In the example of FIG. 6, the template 200 includes various fields, including a subject heading 204, which displays information such as business unit 206, job title 208, and location 210. Near the subject heading 204, the template 200 also includes an "APPLY NOW" button 212, which may link to a visual job advertisement, such as that discussed above, or the hiring company's corporate website. The "APPLY NOW" button 212 may be any clickable button that directs the candidate to more information (i.e., it need not be labeled "APPLY NOW," although in most instances it will lead a candidate to an interface that permits them to apply to the job). Beneath the "APPLY NOW" button 212, the template 200 includes fields for an introduction section 214, which is intended to comprise about one to three sentences about the company and the position. Additional fields follow, including job family 216, industry 218, level 220, compensation 222, information about the company 224, and keywords 226. The keywords listed in field 226 are extracted from the original text-based job description, and are useful for search engine optimization purposes.

Each of the fields 204 through 226 may be filled automatically by scanning for various keywords within a text-based job description. The scanning and filling may be performed by a server and/or one of the computing devices 12, 14, 16 discussed above. The fields 204 through 226 may be filled by identifying various keywords in the text-based job description and inserting them into a corresponding one of the fields 204 through 226. While one example template 200 is shown in FIG. 6, it should be understood that variations of the template 200 come within the scope of this disclosure.

An example condensed job description 202 is shown in FIG. 7. In FIG. 7, a template similar to the template 200 was used. Among other differences, however, some information has been rearranged in the text-based job description 202 of FIG. 7 such that it is displayed higher than in the template 200 of FIG. 6. For instance, the "APPLY NOW" button 212 in FIG. 7 is displayed above the subject heading 204, whereas it is below the subject heading 204 in FIG. 6. The "APPLY NOW" button 212 may be on a fixed banner 230, such that the "APPLY NOW" button 212 is always readily clickable. Further, in this example the fixed banner 230 includes information that is repeated elsewhere in the condensed job description 202. Specifically, the business unit 206, job title 208, and location 210 fields are repeated in the fixed banner 230. This disclosure is not limited to condensed job descriptions with fixed banners, although the fixed banners provide a more efficient user display by keeping certain highly relevant information and the "APPLY NOW" button 212 available to the user.

The text-based job description 202 does not include all of the fields from the template 200. For instance, the job family 216 field is not present in the text-based job description 202. The text-based job description 202 may be customizable, and may include additional fields not discussed herein. The fields may also be rearranged as desired.

Accordingly, the condensed job description 202 provides a more focused version of a text-based job description. A job board could use such condensed job descriptions in conjunction with, or as a replacement for, traditional job postings. Further, a job board may use the condensed job description 202 as a "mask" of sorts, which is presented to a user first, and then the traditional job posting could be accessed via a link in the condensed job description 202. In this example, both the "mask" and the underlying traditional job posting may link to a visual job description. Alternatively, job board could use the condensed job description 202 as a wholesale replacement for a traditional text-based job posting. And again, the job board may use the condensed job description 202 in connection with a visual job advertisement. Specifically, the condensed job description 202 may link to the visual job advertisement through the "APPLY NOW" button 212. This way, the job applicant is presented with easily digested information on many fronts, which has compounding benefits for the hiring company and the job applicant.

While not shown in FIG. 6 or 7, it should be understood that the condensed job description may be customizable by the hiring company. For instance, the hiring company may integrate their company profile, including information such as a company logo and a company description, into the condensed job description, much the same way with the visual job advertisement. As such, both the visual job advertisement and the condensed job descriptions may serve not only as effective job advertisements, but also as corporate branding statements. Because the information presented therein is visually appealing and well organized, the visual job advertisement and the condensed job descriptions are more likely to be shared via text message, email and social media, which has a number of benefits, such as a positive branding statement being spread to applicants, more qualified applicants applying to a job, and a more effective job search for the potential employer.

The visual job advertisement and the condensed job descriptions also provide a significantly higher "apply start rate," which is the rate of clicks to views, or stated another way the rate at which candidates click "APPLY NOW" (or a similar button) after viewing the job ad. In particular, based on data from one job board, the visual job advertisement and the condensed job descriptions have a four to five times higher "apply start rate" over traditional text based job descriptions. Further, candidates are more likely to be engaged, and for longer, with a visual job description than a text based job description, which leads to more qualified candidates applying for a particular posting. In other words, the visual job advertisement and the condensed job descriptions are more engaging and thus candidates spend more time reviewing them. Accordingly, candidates make a more informed decision when applying to a particular posting, and thus they are more likely to be qualified for a particular job, and, again, these candidates apply for the job at a higher rate.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
receiving an input of text of a job description at a computing device, the input of text including a plurality of sentences;
converting the input of text to a condensed job description;
sending the condensed job description to at least one job board;
generating a visual job advertisement based on the input of text, wherein the visual job advertisement is created using the following steps:
identifying, using the computing device, keywords within the plurality of sentences by comparing the input of text with a predefined table of keywords;
from the plurality of sentences, grouping, using the computing device, all sentences having a first common keyword into a first sentence group and all sentences having a second common keyword into a second sentence group;
assigning, using the computing device, an image to each of the first sentence group and the second sentence group, each of the assigned images representative of the first common keyword and the second common keyword, respectively;
creating, using the computing device, the visual job advertisement containing a first and second block, wherein the first block comprises (1) the first common keyword, (2) the sentences having the first common keyword that were grouped into the first sentence group, and (3) the image assigned to the first sentence group, wherein the second block comprises (1) the second common keyword, (2) the sentences having the second common keyword that were grouped into the second sentence group, and (3) the image assigned to the second sentence group; and
wherein both the condensed job description and the visual job advertisement are accessible via the Internet; and
wherein the condensed job description includes a link to the visual job advertisement.

2. The method as recited in claim 1, wherein the converting step includes:
scanning the input of text for keywords and filling in fields in a template with corresponding keywords from the input of text.

3. The method as recited in claim 2, wherein the condensed job description includes a fixed banner repeating at least some of the information from the fields.

4. The method as recited in claim 3, wherein the fixed banner includes an apply now button.

5. The method as recited in claim 1, wherein the first common keyword and the second common keyword are (1) one of the identified keywords and (2) located in each respective sentence before any other keywords of the identified keywords within the respective sentence, and wherein at least one sentence from each of the first sentence group and the second sentence group contains a plurality of keywords that are each of the identified keywords.

6. The method as recited in claim 5, wherein sentences including no keywords are not included in any sentence group.

7. The method as recited in claim 5, wherein the second computing device is a server.

8. The method as recited in claim 7, wherein the server receives the input of text from one of a personal computer, a laptop, a tablet, and a mobile device.

9. The method as recited in claim 1, wherein the condensed job description is sent to the at least one job board by a job posting delivery company.

10. The method as recited in claim 9, wherein the condensed job description is sent to a plurality of job boards by the job posting delivery company.

11. A system for creating a job advertisement, comprising:
a first computing device; and
a second computing device in communication with the first computing device, wherein the second computing device comprises a memory storing instructions that, when executed by a processor of the second computing device, causes the second computing device to perform a method, the method comprising:
receiving, from the first computing device, an input of text including a plurality of sentences describing a job;
converting the input of text to a condensed job description;
generating a visual job advertisement based on the input of text, wherein the visual job advertisement is generated using the following steps:
identifying, by the second computing device, keywords within the plurality of sentences by comparing the input of text with a predefined table of keywords;
from the plurality of sentences, grouping, by the second computing device, all sentences having a first common keyword into a first sentence group and all sentences having a second common keyword into a second sentence group;
assigning, by the second computing device, an image to each of the first sentence group and the second sentence group, each of the assigned images representative of the first common keyword and the second common keyword, respectively;
creating, by the second computing device, the visual job advertisement, the visual job advertisement containing a first and second block, wherein the first block comprises (1) the first common keyword, (2) the sentences having the first common keyword grouped into the first sentence group, and (3) the image assigned to the first sentence group, wherein the second block comprises (1) the second common keyword, (2) the sentences having the second common keyword grouped into the second sentence group, and (3) the image assigned to the second sentence group; and
wherein both the condensed job description and the visual job advertisement are accessible via the Internet; and
wherein the condensed job description includes a link to the visual job advertisement.

12. The system as recited in claim 11, wherein the converting step includes:
   scanning the input of text for keywords and filling in fields in a template with corresponding keywords from the input of text.

13. The system as recited in claim 11, wherein the second computing device is a server.

14. The system as recited in claim 13, wherein the first computing device includes a personal computer, a laptop, a tablet, or a mobile device.

15. The system as recited in claim 11, wherein the first common keyword and the second common keyword are (1) one of the identified keywords and (2) located in each respective sentence before any other keywords of the identified keywords within the respective sentence, and wherein at least one sentence from each of the first sentence group and the second sentence group contains a plurality of keywords that are each of the identified keywords.

\* \* \* \* \*